(12) United States Patent
Nho et al.

(10) Patent No.: US 6,828,401 B2
(45) Date of Patent: Dec. 7, 2004

(54) PREPARATION METHOD OF PEG-MALEIMIDE DERIVATIVES

(75) Inventors: Kwang Nho, Orinda (KR); Changmin Hyun, Seoul (KR); Junghun Lee, Kyonggi-do (KR); Youngkyoung Pak, Seoul (KR)

(73) Assignee: SunBio Inc., Anyang-si (KR)

( * ) Notice: Subject to any disclaimer, the term of this patent is extended or adjusted under 35 U.S.C. 154(b) by 0 days.

(21) Appl. No.: 10/697,409

(22) Filed: Oct. 29, 2003

(65) Prior Publication Data

US 2004/0225097 A1 Nov. 11, 2004

(30) Foreign Application Priority Data

May 7, 2003 (KR) ................................ 10-2003-0028807

(51) Int. Cl.⁷ ............................................. C08F 116/12
(52) U.S. Cl. ...................... 526/333; 526/208; 526/213; 526/214; 526/217; 526/262; 526/307.5; 526/307.6; 526/307.7; 526/318.3
(58) Field of Search ................................ 526/208, 213, 526/214, 217, 262, 307.5, 307.6, 307.7, 318.3, 333

(56) References Cited

U.S. PATENT DOCUMENTS

| | | | |
|---|---|---|---|
| 4,179,337 A | 12/1979 | Davis et al. | |
| 5,166,322 A | * 11/1992 | Shaw et al. | 530/351 |
| 5,648,506 A | 7/1997 | Desai et al. | |
| 5,977,163 A | 11/1999 | Li et al. | |
| 2004/0115165 A1 | * 6/2004 | Rosen et al. | |

OTHER PUBLICATIONS

Abraham Abuchowski et al., J. Biol. Chem., vol. 252, No. 11, pp 3578–3581 (1977).
Charles O. Beauchamp et al., Anal. Biochem., vol. 131, pp 25–33 (1983).
J. Milton Harris, polyethylene glycol (1998).
John S. Holcenberg and Joseph Roberts, Enzymes as Drugs, pp 367–383 (1981).
Timothy P. Kogan, Synth commun., vol. 22, No. 16, pp 2417–2424 (1992).
E. Ranucci, P. Ferruti, Synth, Communl., vol. 20, pp 2951–2957 (1990).
Carol K. Sauers, J. O. C., vol. 34, No. 8, pp 2275–2279 (1969).
J. Velickovic and M. Plavsic et al., Eur. Polym. J., vol. 19, pp 1177–1176 (1983).
Kenneth J. Wieder and Frank F. David, J. Appl. Biochem., vol. 5, pp 337–347 (1983).

* cited by examiner

Primary Examiner—Helen L. Pezzuto
(74) Attorney, Agent, or Firm—Knobbe Martens Olson & Bear LLP.

(57) ABSTRACT

The present invention relates to novel synthetic methods for PEG-maleimide derivatives, specifically, novel synthetic methods for PEG-maleimide. The final products thereof are useful as a pegylation reagent in the field of bioengineering and the medicinal field or the preparation of medical appliances and by conjugating with certain moieties or specific domains of polysaccharides and biological proteins such as antibodies as a bio-compatible or bio-degradable polymer.

25 Claims, No Drawings

PREPARATION METHOD OF PEG-MALEIMIDE DERIVATIVES

CROSS REFERENCE TO RELATED APPLICATION

This application is an international patent application, claiming the benefit under 35 USC § 111(a) of Korean Patent Application No. 10-03-28807, filed May 7, 2003, the disclosure of which is incorporated herein by reference in its entirety.

FIELD OF THE INVENTION

This invention relates to novel synthetic method of PEG-maleimide derivatives, specifically, novel synthetic method of PEG-maleimide which can be a useful pegylation (the art of PEG conjugation with targets such as proteins) reagent for the bioengineered therapeutic products such as antibody, protein, enzyme, general pharmaceuticals, and medical devices and appliances.

BACKGROUND OF THE INVENTION

PEG (polyethylene glycol) is amphiphilic polymer that is soluble not only in water but also in organic solvents. Therefore, even poorly soluble material in water can be converted to possess hydrophilicity when conjugated with PEG. PEG is known to be weakly immunogenic and almost nontoxic to human, thus can be useful in bioengineering field and has been widely applied as parenteral, oral, and implant formulations. A general type of PEG is a linear macromolecule having hydroxyl substituents at the both ends, of which the chemical structure is expressed as HO—$CH_2CH_2$O—($CH_2CH_2$O), —$CH_2CH_2$—OH or simply HO-PEG-OH in which -PEG-, abbreviation of ($CH_2CH_2$O)$_n$, means a polymer skeleton not having terminal substituents.

As an another type of PEG, methoxy-PEG-OH having a methoxy substituent at one end and a hydroxyl substituent at the other end, termed as "MPEG" hereinafter, has been generally used, of which the chemical structure is expressed as $CH_3$O—$CH_2CH_2$—($CH_2CH_2$O)$_n$—$CH_2CH_2$—OH.

In general, polyethylene glycol (PEG) dissolves in organic solvents as well as in water, and thus even extremely water insoluble substances can show potent solubility when conjugated with PEG, thereby giving appropriate-properties to the conjugates for applications in human. When a PEG conjugate is administered to biological systems, characteristics of extended residence time and reduced rate of renal clearance are often observed. For example, U.S. patents (U.S. Pat. Nos. 5,977,163 and 5,648,506) describe PEG-taxol conjugates wherein the taxol is used for a pharmaceutical treatment for ovarian and mammalian cancers. While taxol is known to be extremely water insoluble thereby making it difficult to be formulated as a parenteral, the PEG-taxol, a PEG-conjugated form of taxol, demonstrates improved water solubility more than 1000 times than that of natural taxol.

The conjugation of PEG with protein reduces the toxicity for human organs such as reducing the response of immune rejection and renal clearance rate etc. and the increase in total molecular weight due to the PEG attachment significantly increases the retention time of the conjugate in blood. Since a PEG-conjugated substance can reduce the absorption by the cells and alter the electric property of cell surface, it can exert specific function as a drug carrier into a body. As a basis of such above-described advantages, some PEG active derivatives conjugated with various proteins or enzymes have been used as useful medicine (I. Milton, H. Polyethylene glycol chemistry, 1992).

In an exemplary biotechnological application, polyethylene glycol-adenosine deaminase (PEG-ADA) prepared by the conjugating PEG with adenosine deaminase (ADA) has been used as treatment for severe combined immunodeficiency in children. Additionally, PEG-interferon and PEG-GCSF have been successfully used as anti-viral agent and leukocyte stimulating factor, respectively.

As various PEG derivatives have been developed for use as various medical preparations, some synthetic methods of the reagents prepared by modifying the terminal ends of PEG or mPEG with amine, N-hydroxy succinimidyl ester and so on, have already been reported (U.S. Pat. No. 4,179,337; J. Biol, Chem., 252, p. 3578, 1977; Anal. Biochem., 13, p. 25, 1983; Macromol. Chem., 182, p1397, 1981; Eur. Polym. J., 19, p 1177, 1983; Synth. Commun., 20, p2951, 1990). However, most of those have been used as reagents conjugated directly with the lysine moiety of protein or amino terminal ends. These approaches have been successfully applied to some protein cases however, they have disadvantages such as the remarkable reduction of physiological activity resulting from the random attachment of PEG to an amino moiety (Abuchowski, A. et al.; "Enzymes as Drugs" p. 367–383, 1981; J. Appl. Biochem., 5 p337, 1983).

To overcome the disadvantages described above, the synthetic method for preparing PEG derivatives having novel maleimidyl substituent such that PEG is derivafized to selectively conjugate with sulfhydryl moiety of cysteine of protein, has been developed (Bio/Technology, 8 p343, 1990; Chemistry of Peptide and Proteins, 2, p. 29, 1984; Synthetic Comm., 22(16), p. 2417, 1992).

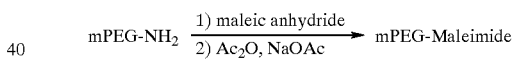

However, it was revealed that the above-described method gave rise to problems in preparing PEG derivatives such as the production of various by-products other than maleimidyl derivative as a main product according to the condition of reaction temperature and basic catalyst. For example, at a lower reaction temperature, isoimidyl adduct (A) as a kinetic intermediate as shown below is formed. And in excess amount of basic catalyst, Michael adduct (B) can be formed through the Michael addition to the already formed maleimidyl group. Under high temperature conditions, acetanilide by-product (C) having acetanilide group can be formed.

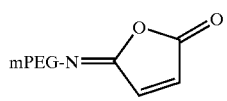

A. mPEG-Isoimide

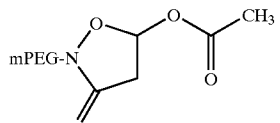

B. Michael adduct

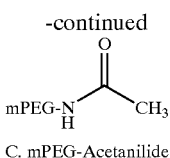

C. mPEG-Acetanilide

As described above, conventional methods in cited literature have several problems such as, very low yield and presence of significant amount of byproducts and impurities after PEG has been solidified. Furthermore, the conventional method is not economical because as the molecular weight of PEG increases, the purification of final product from the intermediate is difficult due to large macromolecular property and thus additional steps such as expensive column chromatography process are required (*J. Mat. Sci., C*37, p. 61 1997; *J. Org. Chem.*, 34(8) p. 2275 1969; *Ger. Offen.*, 3, pp751–901 1978; *Ger. Offen.*, 2 pp. 837–919 1979).

Each publication cited above and herein is incorporated herein by reference in its entirety to describe and disclose the subject matter for which it is cited.

The present inventors have endeavored to develop novel synthetic methods which can provide with high purity and high yield to overcome the problems of conventional synthetic methods in preparing PEG-maleimide derivatives, i.e., low yield, very low purity etc.

SUMMARY OF THE INVENTION

One embodiment of the present invention provides a novel synthetic method for preparing PEG-maleimide derivative which selectively reacts with physiologically active substances having one or more sulfhydryl groups with high yield and purity to overcome the problems of conventional synthetic methods with low yield and purity.

Another embodiment of the present invention is to provide a novel synthetic method for preparing PEG-maleimide derivatives via a cyclization reaction using pentafluorophenyl trifluoroacetate.

DETAILED DESCRIPTION OF THE INVENTION

One embodiment of the present invention is to provide a method for preparing mPEG-maleimide polymer compounds represented by general formula (I) characterized by reacting mPEG-maleamic acid derivatives represented by general formula (I-a) with a reactant such as pentafluorophenyl trifluoroacetate in the presence of one or more base and organic solvent.

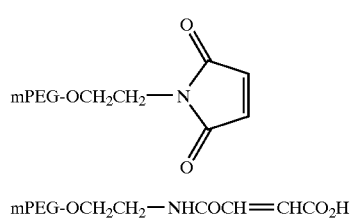

Another embodiment of the present invention is to provide a method for preparing PEG-(maleimide)$_2$ polymer compounds represented by general formula (II) characterized by reacting PEG-(maleimide)$_2$ derivatives represented by general formula (II-a) with a reactant such as pentafluorophenyl trifluoroacetate in the presence of one or more base and organic solvent.

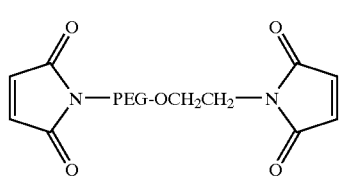

(II-a)

Still another embodiment of the present invention is to provide a method for preparing multi-arm PEG-maleimide polymer compounds represented by general formula (III) characterized by reacting multi-arm PEG-maleimide derivatives represented by general formula (III-a) with a reactant such as pentafluorophenyl trifluoroacetate in the presence of base and organic solvent.

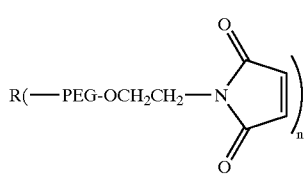

(III-a)

wherein
R is the central core of PEG polymer, such as sorbitol or pentaerythritol, n is an integer of 3 to 12 which represents the number of arms.

Yet another embodiment of the present invention is to provide a method for preparing pendant type multi-arm PEG-maleimide polymer compounds represented by general formula (IV) characterized by reacting pendant type multi-arm PEG-maleamic acid represented by general formula (IV-a) with a reactant such as pentafluorophenyl trifluoroacetate in the presence of base and organic solvent.

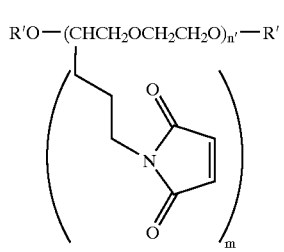

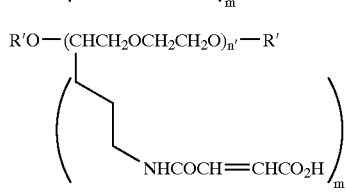

wherein,
R' is a hydrogen atom or a lower alkyl group having 1 to 3 carbons, n' is an integer of 3 to 3000, and m is an integer of 1 to 20, preferably 3 to 12, which represents the number of arms.

In the above described methods for preparing polymer compounds represented by general formula (I) to (IV), DIEA (diisopropylethyl amine), DEA (Diethyleneamine) and the like are preferred as a base and the solvent mixture of dichloromethane: DMF with a mix ratio of 1-4:1 is preferred. It is preferable that the reactions are executed at a temperature ranging from 50 to 60° C. for 24 hrs.

Embodiments of the present invention can be explained by the methods in the reaction schemes hereinafter, which are merely exemplary and in no way limit the scope of the present invention. The following schemes show the steps for preparing the representative compounds of the present invention, and other compounds also may be produced by following the steps with appropriate modifications of reagents and starting materials, which can be envisaged by those skilled in the art. The following schemes and examples are a part of all possible derivatives and are not intended to limit the scope of the invention.

General Synthetic Procedures

Scheme 1

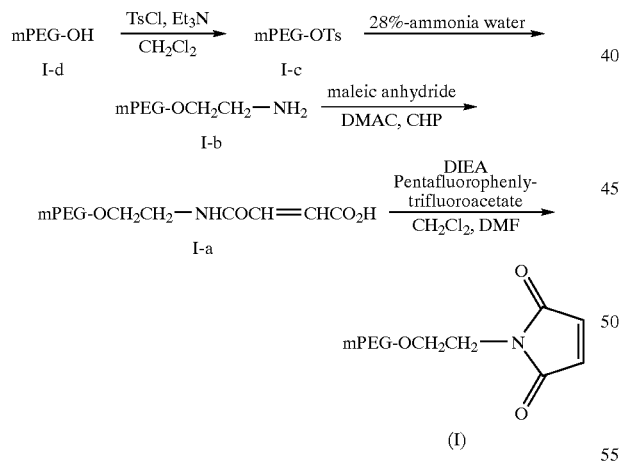

For example, mPEG-maleimide polymer compound represented by general formula (I) can be prepared by the method as depicted in above Scheme 1. In the $1^{st}$ step, mPEG-OH (I-d) is reacted with p-toluenesulfonyl chloride as a tosylating agent and base catalyst such as TEA (Triethyleneamine) in the presence of dichloromethane as an organic solvent to produce mPEG-tosylate (I-c); in the $2^{nd}$ step, the produced compound (I-c) in step 1 is reacted with ammonia water at the dilution ratio of ranging from 20 to 30%, preferably 28% ammonia water, to produce amine compound (I-b); in the 3rd step, the produced amine compound (I-b) in step 2 is reacted with maleic acid anhydride as a reacting agent in an organic solvent mixture of DMAC (N,N-dimethylacetamide) and CHP (N-cyclohexylpyrrolidinone), preferably with a mix ratio of about 5:1, respectively, to produce a maleamic acid compound (I-a); at $4^{th}$ step, the produced compound (I-a) in step 3 is reacted with pentafluorophenyl trifluoroacetate as a reacting agent in the presence of dichloromethane or base catalyst such as DEA or DIEA in an organic solvent mixture of dichloromethane and DMF (Dimethyl formamide), preferably with a solvent mix ratio of about 4:1, respectively, to produce the final mPEG-maleimide derivative product (I).

Scheme 2

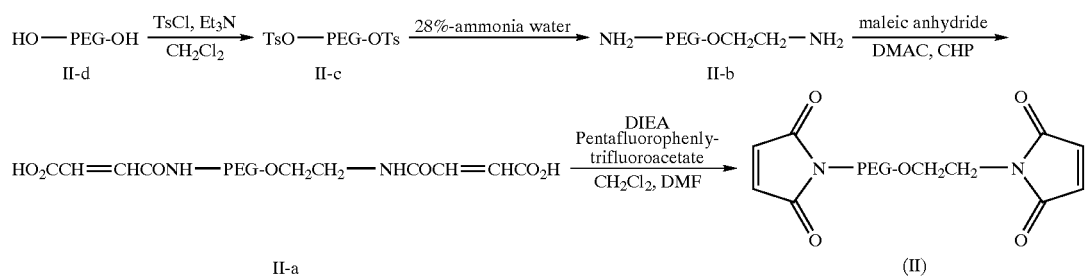

For example, mPEG-(maleimide)$_2$ polymer compound represented by general formula (II) can be prepared by the method as depicted in above Scheme 2. In the $1^{st}$ step, HO-PEG-OH (II-d) is reacted with p-toluenesulfonyl chloride as a tosylating agent and a base catalyst such as TEA (Triethyleneamine) in the presence of dichloromethane as a organic solvent to produce tosyl compound (II-c); in the $2^{nd}$ step, the produced compound (II-c) in step 1 is reacted with ammonia water at the dilution ratio ranging from 20 to 30%, preferably 28% ammonia water, to produce amine compound (II-b); from the $3^{rd}$ step, the produced amine compound (II-b) in step 2 is reacted with maleic acid anhydride as a reacting agent in an organic solvent mixture of DMAC (N,N-dimethylacetamide) and CHP (N-cyclohexylpyrrolidinone), preferably with a mix ratio of about 5:1 to produce a maleamic acid compound (II-a); in the $4^{th}$ step, the produced compound (II-a) in step 3 is reacted with pentafluorophenyl trifluoroacetate as a reacting agent in the presence of dichloromethane or base catalyst such as DEA or DIEA in an organic solvent mixture of dichloromethane and DMF (Dimethyl formamide), preferably with a mix ratio of about 4:1 to produce final PEG-(maleimide)$_2$ derivative product (II).

Scheme 3

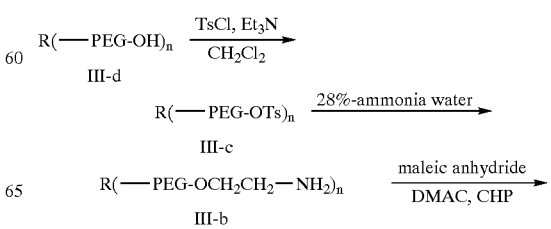

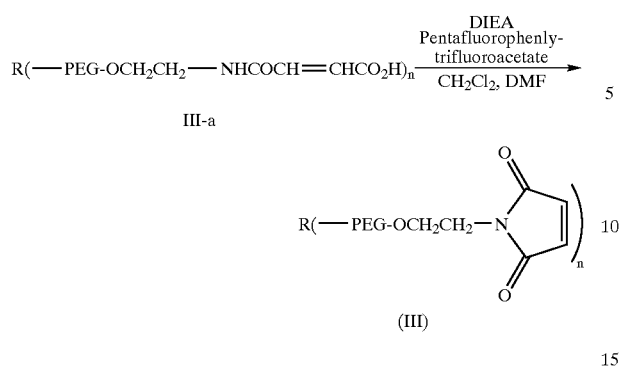

(III)

In above Scheme 3, R is a core of multi-arm PEG, n is an integer of 3 to 12 which indicates the number of arms having PEG as a basic skeleton.

For example, multi-arm PEG-maleimide polymer compound represented by general formula (III) can be prepared by the method as depicted in above Scheme 3. In the $1^{st}$ step, multi-arm PEG (III-d) is reacted with p-toluenesulfonyl chloride as a tosylating agent and base catalyst such as TEA (Triethyleneamine) in the presence of dichloromethane as a organic solvent to produce tosyl compound (III-c); in the $2^{nd}$ step, the produced compound (III-c) in step 1 is reacted with ammonia water at the dilution ratio of ranging from 20 to 30%, preferably 28% ammonia water, to produce amine compound (III-b); in the $3^{rd}$ step, the produced amine compound (III-b) in step 2 is reacted with maleic acid anhydride as a reacting agent in an organic solvent mixture of DMAC (N,N-dimethylacetamide) and CHP (N-cyclohexylpyrrolidinone), preferably with a mix ratio of about 5:1 to produce a maleamic acid compound (III-a); in the $4^{th}$ step, the produced compound (III-a) in step 3 is reacted with pentafluorophenyl trifluoroacetate as a reacting agent in the presence of dichloromethane or base catalyst such as DEA or DIEBA (Diisopropylethylamine) in an organic solvent mixture of dichloromethane and DMF (Dimethyl formamide), preferably with a mix ratio of about 4:1 to produce final multi-arm PEG-maleimide derivative product (III).

Scheme 4

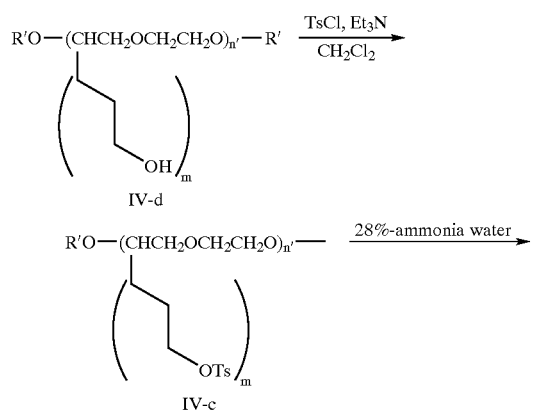

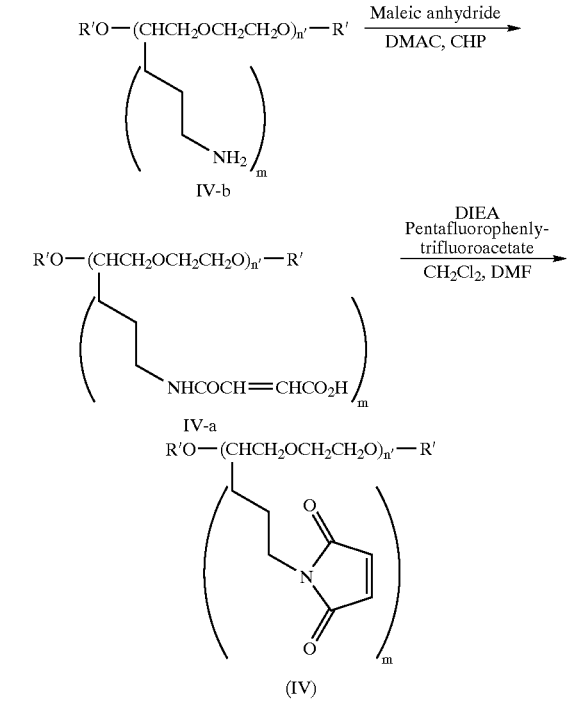

In above Scheme 4, R' is a hydrogen or a lower alkyl group, n' is an integer of 3 to 3000, and m is an integer of 1 to 20 which represents the number of propyl chain arms, for example, the PEG having 10 number of chains is designated as 10-arm pendant PEG.

For example, pendant type multi-arm PEG-maleimide polymer compound represented by general formula (IV) can be prepared by the method as depicted in above Scheme 4. In the $1^{st}$ step, pendant PEG (IV-d) is reacted with p-toluenesulfonyl chloride as a tosylating agent and base catalyst such as TEA (Triethyleneamine) in the presence of dichloromethane as an organic solvent to produce tosyl compound (IV); in the $2^{nd}$ step, the produced compound (IV-c) in step 1 is reacted with ammonia water at the dilution ratio of ranging from 20 to 30%, preferably 28% ammonia water, to produce amine compound (IV-b); in the $3^{rd}$ step, the produced amine compound (IV-b) in step 2 is reacted with maleic acid anhydride as a reacting agent in an organic solvent mixture of DMAC (N,N-dimethylacetamide) and CHP (N-cyclohexylpyrrolidinone), preferably with a mix ratio of about 5:1 to produce a maleamic acid compound (IV-a); in the $4^{th}$ step, the produced compound (IV-a) in step 3 is reacted with pentafluorophenyl trifluoroacetate as a reacting agent in the presence of dichloromethane or base catalyst such as DEA or DIEA (Diisopropylethylamine) in an organic solvent mixture of dichloromethane and DMF (Dimethyl formamide), preferably with a mix ratio of about 4:1 to produce final pendant type multi-arm PEG-maleimide derivative product (IV).

The polymers, which can be prepared by above described methods according to the present invention, can comprise all possible PEG-based type polymers comprising linear mPEG, bifunctional linear PEG, multi-arm PEG, pendant type multi-arm PEG, and any type of hydrophilic polymeric substances. However, PEG polymers having a molecular weight ranging from 100 to 1,000,000 Daltons are preferred. PEG polymers having a molecular weight ranging from 1,000 to 100,000 Daltons are more preferred.

The final compound of the present invention can be useful in optional use, for example, selective conjugation with cysteine moiety of protein, specific domain of polysaccharide, antibody or the compounds comprising sulfhydryl group etc. as a biodegradable polymer and provide copolymer with specific advantage having hydrophobic and hydrophilic property.

Hereinafter, the present invention is more specifically explained by the following examples. However, it should be understood that the scope of the present invention is not limited to these examples in any manner.

EXAMPLES

Example 1

Synthesis of mPEG-maleimide 20K 1-1. Synthesis of mPEG-tosylate 20K 2.5 ml of TEA (18 mM) was added to 60 g of mPEG-OH (M.W.:20,000, 3 mM) dissolved in 300 ml of dichloromethane and stirred for about 10 minutes. 2.9 g of p-toluensulfonyl chloride (TsCl, 15 mM, 5 equivalents) dissolved in dichloromethane was added thereto and stirred for 20 hours at room temperature. The solution was filtered and the filtrate was washed two times with saturated $NH_4Cl$ solution. The organic solvent was then dried over $MgSO_4$. The solvent was removed and the product was precipitated with ethyl ether. The product was collected by filtration and dried for 12 hours under vacuum to obtain 58 g of mPEG-tosylate.

$^1$H-NMR ($CDCl_3$) δ: 2.45 ppm (s, 3H, —$CCH_3$), 3.36 ppm (s, 3H, —$OCH_3$), 3.64 ppm (s, 1818H, PEG backbone, —$OCH_2$—), 4.24 ppm (t, 12H, —$CH_2OTs$), 7.35–7.79 ppm (d, 4H, aromatic ring).

1-2. Synthesis of mPEG-amine 20K 400 ml of ammonia water was added to 58 g of mPEG-tosylate compound (M.W.:20,155, 2.88 mM) and stirred for 10 days at room temperature. The reaction mixture was extracted two times with dichloromethane and the organic solvent dried over $MgSO_4$. The solvent was removed and the product was precipitated with ethyl ether. The product was collected by filtration and dried for 12 hours under vacuum to obtain 55 g of mPEG-amine.

$^1$H-NMR ($CDCl_3$) o: 2.87 ppm (t, 2H, —$CH_2NH_2$), 3.36 ppm (s, 3H, —$OCH_3$), 3.64 ppm (s, 1818H, PEG backbone, —$OCH_2$—).

1-3. Synthesis of mPEG-maleamic acid 20K 55 g of mPEG-amine (M.W.: 20,000, 2.72 mM) obtained from above steps 1 and 2 was dissolved in 220 ml of DMAC and 55 ml of CHP and 2.7 g of maleic acid anhydride (27.5 mM, 10 equivalent) was added thereto. The reaction mixture was further heated and stirred at 80° C. for 16 hours in Dean-Stark trap set apparatus using toluene as a co-solvent. The reaction temperature was cooled to room temperature and the product was precipitated with ethyl ether. The product was collected by filtration and dried for 12 hours under vacuum to obtain 52 g of mPEG-maleamic acid.

$^1$H-NMR ($CDCl_3$) δ: 3.36 ppm (s, 3H, $OCH_3$), 3.64 ppm (s, 1818H, PEG backbone, —$OCH_2$—), 6.28 ppm, 6.15 ppm (d, 2H, —$O_2CCHCHCO_2H$).

1-4. Synthesis of mPEG-maleimide 20K 52 g of mPEG-maleamic acid (M.W.: 20,100, 2.59 mM) obtained from above steps 1-3 was dissolved in 156 ml of dichloromethane and 39 ml of DMF. 1.1 ml of DIEA (6.48 mM, 2.5 equivalent) and 1.1 ml of pentafluorophenyl trifluoroacetate (6.48 mM, 2.5 equivalent) was added thereto at 0° C. and stirred at 55° C. for 24 hours. The solvent was removed and the product was precipitated with ethyl ether. The filtrate was dissolved in 1 of dichloromethane and 20 g of activated carbon was added and stirred for 5 hours. The reaction mixture was filtered with celite pad to remove activated carbon and the solvent was removed by distillation. The product was precipitated with ethyl ether. The product was collected by filtration and dried for 12 hours under vacuum to obtain 30 g of MPEG-maleimide 20K.

$^1$H-NMR ($CDCl_3$) δ: 3.36 ppm (s, 3H, $OCH_3$), 3.64 ppm (s, 1818H, PEG backbone, —$OCH_2$—), 6.70 ppm (s, 2H, —CH=CH—).

Example 2

Synthesis of PEG-bis(maleimide) 10K 2-1. Synthesis of PEG-(tosylate)20K 8.4 ml of TEA (60 mM, 12 equivalents) was added to 50 g of PEG-$(OH)_2$ (M.W.: 10,000, 5 mM) dissolved in 250 ml of dichloromethane and stirred for about 10 minutes. 9.5 g of p-toluensulfonyl chloride (TsCl, 50 mM, 10 equivalents) dissolved in dichloromethane was added thereto and stirred for 20 hours at room temperature. The solution was filtered and the filtrate was washed two times with saturated $NH_4Cl$ solution. The organic solvent was then dried over $MgSO_4$. The solvent was removed and the product was precipitated with ethyl ether. The product was collected by filtration and dried for 12 hours under vacuum to obtain 49 g of PEG-$(tosylate)_2$ 10K.

$^1$H-NMR ($CDCl_3$) δ: 2.45 ppm (s, 6H, —$CCH_3$), 3.34 ppm (s, 909H, PEG backbone, —$OCH_2$—), 4.24 ppm (t, 4H, —$CH_2OTs$), 7.35–7.79 ppm (d, 8H, aromatic ring).

2-2. Synthesis of PEG-($NH_2$ 10K 300 ml of ammonia water was added to 49 g of bifunctional PEG-$(tosylate)_2$ (M.W.:10,310, 4.75 mM) and stirred for 10 days at room temperature. The reaction mixture was extracted two times with dichloromethane and the organic solvent dried over $MgSO_4$. The solvent was removed and the product was precipitated with ethyl ether. The product was collected by filtration and dried for 12 hours under vacuum to obtain 47 g of PEG-$(NH_2)_2$ 10K.

$^1$H-NMR ($CDCl_3$) δ: 2.87 ppm (t, 2H, —$CH_2NH_2$), 3.64 ppm (s, 909H, PEG backbone, —$OCH_2$—).

2-3. Synthesis of PEG-(maleamic acid)$_2$ 10K 47 g of PEG-$(NH_2)_2$ (M.W.: 10,000, 4.7 mM) obtained from above 2-2 step was dissolved in 188 ml of DMAC and 47 ml of CHP and 9.2 g of maleic acid anhydride (94 mM, 20 equivalent) was added thereto. The reaction mixture was further heated and stirred at 80° C. for 16 hours in Dean-stark trap set apparatus using toluene as a co-solvent. The reaction temperature was cooled to room temperature and the product was precipitated with ethyl ether. The product was collected by filtration and dried for 12 hours under vacuum to obtain 44 g of PEG-(maleamic acid)$_2$ 10K.

$^1$H-NMR ($CDCl_3$): 3.64 ppm (s, 909H, PEG backbone, —$OCH_2$—), 6.28 ppm, 6.15 ppm (d, 4H, —$O_2CCHCHCO_2H$).

2-4. Synthesis of PEG-(maleimide)$_2$ 10K 44 g of PEG-(maleamic acid)$_2$ (M.W.: 10,200, 4.31 mM) obtained from above 2-3 step was dissolved in 132 ml of dichloromethane and 33 ml of DMF. 3.8 ml of DIEA (21.6 mM, 5 equivalent) and 3.7 ml of pentafluorophenyl trifluoroacetate (21.6 mM, 5 equivalent) was added thereto at 0° C. and stirred at 55° C. for 24 hours. The solvent was removed and the product was precipitated with ethyl ether. The filtrate was dissolved in 800 ml of dichloromethane and 16 g of activated carbon was added and stirred for 5 hours. The reaction mixture was filtered with celite pad to remove activated carbon and the solvent was removed by distillation. The product was precipitated with ethyl ether. The product was collected by filtration and dried for 12 hours under vacuum to obtain 20 g of PEG-(maleimide)$_2$ 10K.

$^1$H-NMR (CDCl$_3$) δ: 3.64 ppm (s, 909H, PEG backbone, —OCH$_2$—), 6.70 ppm (s, 4H, —CH=CH—).

Example 3

Synthesis of multi-arm PEG-maleimide 3-1. Synthesis of 4-arm PEG-maleimide 10K 3-1-1. Synthesis of 4-arm PEG-tosylate 10K 6.7 ml of TEA (48 mM, 24 equivalents) was added to 20 g of PEG-OH (M.W.: 10,000, 2 mM)) dissolved in 100 ml of dichloromethane and stirred for about 10 minutes. 7.6 g of p-toluensulfonyl chloride (TsCl, 40 mM, 20 equivalents) dissolved in dichloromethane was added thereto and stirred for 20 hours at room temperature. The solution was filtered and the filtrate was washed two times with saturated NH$_4$Cl solution. The organic solvent was then dried over MgSO$_4$. The solvent was removed and the product was precipitated with ethyl ether. The product was collected by filtration and dried for 12 hours under vacuum to obtain 19 g of 4-arm PEG-tosylate 10K.

$^1$H-NMR (CDCl$_3$) δ: 2.45 ppm (s, 12H, —CCH$_3$), 3.41 ppm (s, 8H, —CCH$_2$O—), 3.64 ppm (s, 909H, PEG backbone, —OCH$_2$—), 4.24 ppm (t, 8H, —CH$_2$OTs), 7.35–7.79 ppm (d, 16H, aromatic ring).

3-1-2. Synthesis of 4-arm PEG-NH$_2$ 10K 200 ml of ammonia water was added to 19 g of 4-arm PEG-tosylate (M.W.:10,620, 1.79 mM) and stirred for 10 days at room temperature. The reaction mixture was extracted two times with dichloromethane and the organic solvent dried over MgSO$_4$. The solvent was removed and the product was precipitated with ethyl ether. The product was collected by filtration and dried for 12 hours under vacuum to obtain 17 g of 4-arm PEG-NH$_2$ 10K.

$^1$H-NMR (CDCl$_3$) δ: 2.87 ppm (t, 8H, —CH$_2$NH$_2$), 3.41 ppm (s, 8H, —CCH$_2$O—), 3.64 ppm (s, 909H, PEG backbone, —OCH$_2$—).

3-1-3. Synthesis of 4-arm PEG-maleamic acid 10K 17 g of 4-arm PEG-NH$_2$ (M.W.: 10,000, 1.7 mM) obtained from above 3-1-2 step was dissolved in 68 ml of DMAC and 17 ml of CHP and 6.7 g of maleic acid anhydride (68 mM, 40 equivalent) was added thereto. The reaction mixture was further heated and stirred at 80° C. for 16 hours in Dean-stark trap set apparatus using toluene as a co-solvent. The reaction temperature was cooled to room temperature and the product was precipitated with ethyl ether. The product was collected by filtration and dried for 12 hours under vacuum to obtain 15 g of 4-arm PEG-maleamic acid 10K.

$^1$H-NMR (CDCl$_3$) δ: 3.41 ppm (s, 8H, —CCH$_2$O—), 3.64 ppm (s, 909H, PEG backbone, —OCH$_2$—), 6.28 ppm, 6.15 ppm (d, 8H, —O$_2$CCHCHCO$_2$H).

3-1-4. Synthesis of 4-arm PEG-maleimide 10K 15 g of 4-arm PEG-maleamic acid (M.W.: 10,400, 1.44 mM) obtained from above 3-1-3 step was dissolved in 45 ml of dichloromethane and 1 ml of DMF. 2.5 ml of DIEA (14.4 mM, 10 equivalent) and 2.5 ml of pentafluorophenyl trifluoroacetate (14.4 mM, 10 equivalent) was added thereto at 0° C. and stirred at 55° C. for 24 hours. The solvent was removed and the product was precipitated with ethyl ether. The filtrate was dissolved in 300 ml of dichloromethane and 6 g of activated carbon was added and stirred for 5 hours. The reaction mixture was filtered with celite pad to remove activated carbon and the solvent was removed by distillation. The product was precipitated with ethyl ether. The product was collected by filtration and dried for 12 hours under vacuum to obtain 9 g of 4-arm PEG-maleimide 10K.

$^1$H-NMR (CDCl$_3$) δ: 3.41 ppm (s, 8H, —CCH$_2$O—), 3.64 ppm (s, 909H, PEG backbone, —OCH$_2$—), 6.70 ppm (s, 8H, —CH=CH—).

3-2. Synthesis of 6-arm PEG-maleimide 20K 3-2-1. Synthesis of 6-arm PEG-tosylate 20K 10 ml of TEA (72 mM, 36 equivalents) was added to 40 g of 6 arm PEG-OH (M.W.: 20,000, 2 mM)) dissolved in 200 ml of dichloromethane and stirred for about 10 minutes. 11.4 g of p-toluensulfonyl chloride (TsCl, 60 mM, 30 equivalents) dissolved in dichloromethane was added thereto and stirred for 20 hours at room temperature. The solution was filtered and the filtrate was washed two times with saturated NH$_4$Cl solution. The organic solvent was then dried over MgSO$_4$. The solvent was removed and the product was precipitated with ethyl ether. The product was collected by filtration and dried for 12 hours under vacuum to obtain 38 g of 6-arm PEG-tosylate 20K.

$^1$H-NMR (CDCl$_3$) δ: 2.45 ppm (s, 18H, —CCH$_3$), 3.64 ppm (s, 1818H, PEG backbone, —OCH$_2$—), 4.24 ppm (t, 12H, —CH$_2$OTs), 7.35–7.79 ppm (d, 24H, aromatic ring).

3-2-2. Synthesis of 6-arm PEG-NH$_2$ 20K 300 ml of ammonia water was added to 38 g of 6-arm PEG-tosylate (M.W.:20,930, 3.48 mM) and stirred for 10 days at room temperature. The reaction mixture was extracted two times with dichloromethane and the organic solvent dried over MgSO$_4$. The solvent was removed and the product was precipitated with ethyl ether. The product was collected by filtration and dried for 12 hours under vacuum to obtain 35 g of 6-arm PEG-NH$_2$ 20K.

$^1$H-NMR (CDCl$_3$) δ: 2.87 ppm (t, 12H, —CH$_2$NH$_2$), 3.64 ppm (s, 1818H, PEG backbone, —OCH$_2$—)-

3-2-3. Synthesis of 6-arm PEG-maleamic acid 20K 35 g of 6-arm PEG-NH$_2$ (M.W.: 20,000, 1.75 mM) obtained from above 3-2-2 step was dissolved in 140 ml of DMAC and 35 ml of CHP and 10.3 g of maleic acid anhydride (105 mM, 60 equivalent) was added thereto. The reaction mixture was further heated and stirred at 80° C. for 16 hours in Dean-stark trap set apparatus using toluene as a co-solvent. The reaction temperature was cooled to room temperature and the product was precipitated with ethyl ether. The product was collected by filtration and dried for 12 hours under vacuum to obtain 32 g of 6-arm PEG-maleamic acid 20K.

$^1$H-NMR (CDCl$_3$) δ: 3.64 ppm (s, 1818H, PEG backbone, —OCH$_2$—), 6.28 ppm, 6.15 ppm (d, 12H, —O$_2$CCHCHCO$_2$H).

3-2-4. Synthesis of 6-arm PEG-maleimide 20K 32 g of 6-arm PEG-maleamic acid (M.W.: 20,600, 1.55 mM) obtained from above 3-2-3 step was dissolved in 96 ml of dichloromethane and 24 ml of DMF. 4.1 ml of DIEA (23.3 mM, 15 equivalent) and 4.1 ml of pentafluorophenyl trifluoroacetate (23.3 mM, 15 equivalent) was added thereto at 0° C. and stirred at 55° C. for 24 hours. The solvent was removed and the product was precipitated with ethyl ether. The filtrate was dissolved in 600 ml of dichloromethane and 12 g of activated carbon was added and stirred for 5 hours. The reaction mixture was filtered with celite pad to remove activated carbon and the solvent was removed by distillation. The product was precipitated with ethyl ether. The product was collected by filtration and dried for 12 hours under vacuum to obtain 18 g of 6-arm PEG-maleimide 20K.

$^1$H-NMR (CDCl$_3$) δ: 3.64 ppm (s, 1818H, PEG backbone, —OCH$_2$—), 6.70 ppm (s, 12H, —CH=CH—).

Example 4

Synthesis of 10-arm pendent PEG-maleimide

4-1. Synthesis of 10-arm pendent PEG-tosylate 20K 8.4 ml of TEA (60 mM, 60 equivalents) was added to 20 g of 10-arm pendent PEG-OH (M.W.: 20,000, 1 mM)) dissolved in 100 ml of dichloromethane and stirred for about 10 minutes. 9.5 g of p-toluensulfonyl chloride (TsCl, 50 mM, 50 equivalents) dissolved in dichloromethane was added thereto and stirred for 20 hours at room temperature. The solution was filtered and the filtrate was washed two times with saturated $NH_4Cl$ solution. The organic solvent was then dried over $MgSO_4$. The solvent was removed and the product was precipitated with ethyl ether. The product was collected by filtration and dried for about 12 hours under vacuum to obtain 18 g of 10-arm pendent PEG-tosylate 20K.

4-2. Synthesis of 10-arm pendent PEG-NH, 20K 200 ml of ammonia water was added to 18 g of 10-arm pendent PEG-tosylate (M.W.:21,550, 0.84 mM) and stirred for 10 days at room temperature. The reaction mixture was extracted two times with dichloromethane and the organic solvent dried over $MgSO_4$. The solvent was removed and the product was precipitated with ethyl ether. The product was collected by filtration and dried for 12 hours under vacuum to obtain 16 g of 10-arm pendent $PEG-NH_2$ 20K.

4-3. Synthesis of 10-arm pendent PEG-maleamic acid 20K 16 g of 10-arm pendent $PEG-NH_2$ (M.W.: 20,000, 0.8 m) obtained from above 4-2 step was dissolved in 64 ml of DMAC and 16 ml of CHP and 7.9 g of maleic acid anhydride (80 mM, 100 equivalent) was added thereto. The reaction mixture was further heated and stirred at 80° C. for 16 hours in Dean-Stark trap set apparatus using toluene as a co-solvent. The reaction temperature was cooled to room temperature and the product was precipitated with ethyl ether. The product was collected by filtration and dried for 12 hours under vacuum to obtain 15 g of 10-arm pendent PEG-maleamic acid 20K.

4-4. Synthesis of 10-arm pendent PEG-maleimide 20K 32 g of 10-arm pendent PEG-maleamic acid (M.W.: 21,000, 0.71 mM) obtained from above 4-3 step was dissolved in 45 ml of dichloromethane and 11 ml of DMF. 3.1 ml of DIEA (17.8 mM, 25 equivalent) and 3.1 ml of pentafluorophenyl trifluoroacetate (17.8 mM, 25 equivalent) was added thereto at 0° C. and stirred at 55° C. for 24 hours. The solvent was removed and the product was precipitated with ethyl ether. The filtrate was dissolved in 300 ml of dichloromethane and 6 g of activated carbon was added and stirred for 5 hours. The reaction mixture was filtered with celite pad to remove activated carbon and the solvent was removed by distillation. The product was precipitated with ethyl ether. The product was collected by filtration and dried for 12 hours under vacuum to obtain 9 g of 10-arm pendent PEG-maleimide 20K.

As described above, the synthetic method of the present invention is novel and useful method to obtain PEG-maleimide polymer, which can provide with high yield and high purity final product.

The invention thus described, it will be recognized that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for preparing a mPEG-maleimide polymer compound, said method comprising:

reacting an mPEG-maleamic acid derivative in the presence of base, organic solvent and pentafluorophenyl trifluoroacetate, wherein said mPEG-maleamic acid derivative is represented by general formula (I-a)

$$mPEG-OCH_2CH_2-NHCOCH=CHCO_2H \quad \text{(Ia)}$$

thereby forming an mPEG-maleimide polymer compound.

2. The method of claim 1, wherein said base is diisopropylethylamine (DIEA) or diethyleneamine (DEA).

3. The method of claim 1, wherein said organic solvent is the solvent mixture of dichloromethane and dimethylformamide (DMF).

4. The method of claim 3, wherein said solvent mixture of dichloromethane and DMF is in a mix ratio of 4:1.

5. The method of claim 1, wherein said PEG polymer has a molecular weight ranging from about 100 to 1,000,000 Daltons.

6. The method of claim 1, wherein and said PEG polymer has a molecular weight ranging from about 1,000 to 100,000 Daltons.

7. A method for preparing a PEG-(maleimide)$_2$ polymer compound, said method comprising:

reacting a PEG-maleamic acid derivative in the presence of base, organic solvent and pentafluorophenyl trifluoroacetate, wherein said PEG-maleamic acid derivative is represented by general formula (II-a)

$$HO_2CCH=CHCONH-PEG-OCH_2CH_2-NHCOCH=CHCO_2H \text{(II-a)},$$

thereby forming a PEG-(maleimide)$_2$ polymer compound.

8. The method of claim 7, wherein said base is diisopropylethylamine (DIEA) or diethyleneamine (DEA).

9. The method of claim 7, wherein said organic solvent is the solvent mixture of dichloromethane and dimethylformamide (DMF).

10. The method of claim 9, wherein said solvent mixture of dichloromethane and DMF is in a mix ratio of 4:1.

11. The method of claim 7, wherein said PEG polymer has a molecular weight ranging from about 100 to 1,000,000 Daltons.

12. The method of claim 7, wherein and said PEG polymer has a molecular weight ranging from about 1,000 to 100,000 Daltons.

13. A method of preparing a multi-arm PEG-maleimide polymer compound, said method comprising:

reacting a multi-arm PEG-maleamic acid derivative in the presence of base, organic solvent and pentafluorophenyl trifluoroacetate, wherein said multi-arm PEG-maleamic acid derivative is represented by general formula (III-a)

$$R(-PEG-OCH_2CH_2-NHCOCH=CHCO_2H)_n \quad \text{(III-a)}$$

wherein R is central core, n is an integer from 3 to 12 which indicates the number of arms, thereby forming a multi-arm PEG-maleimide polymer compound.

14. The method of claim 13, wherein said perfluorocarbon is pentafluorophenyl trifluoroacetate.

15. The method of claim 13, wherein said base is diisopropylethylamine (DEA) or diethyleneamine (DEA).

16. The method of claim 13, wherein said organic solvent is the solvent mixture of dichloromethane and dimethylformamide (DMF).

17. The method of claim 16, wherein said solvent mixture of dichloromethane and DMF is in a mix ratio of 4:1.

18. The method of claim 13, wherein said PEG polymer has a molecular weight ranging from about 100 to 1,000,000 Daltons.

19. The method of claim 13, wherein and said PEG polymer has a molecular weight ranging from about 1,000 to 100,000 Daltons.

20. A method of preparing a pendant-type multi-arm PEG-maleimide polymer compound, said method comprising:

reacting a pendant-type multi-arm PEG-maleamic acid derivative in the presence of base, organic solvent and pentafluorophenyl trifluoroacetate, wherein said pendant-type multi-arm PEG-maleamic acid derivative is represented by general formula (IV-a):

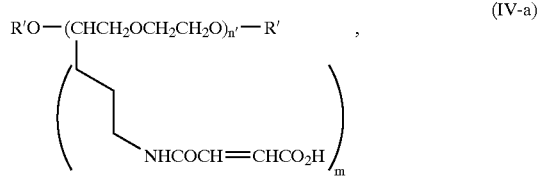

(IV-a)

wherein R' is a hydrogen atom or a lower alkyl group having 1 to 3 carbon, n' is an integer of 3 to 3000, m is an integer of 1 to 20 which represents the number of arms, thereby forming a pendant-type multi-arm PEG-maleimide polymer compound.

21. The method of claim 20, wherein said base is diisopropylethylamine (DIEA) or diethyleneamine (DEA).

22. The method of claim 20, wherein said organic solvent is the solvent mixture of dichloromethane and dimethylformamide (DMF).

23. The method of claim 22, wherein said solvent mixture of dichloromethane and DMF is in a mix ratio of 4:1.

24. The method of claim 20, wherein said PEG polymer has a molecular weight ranging from about 100 to 1,000,000 Daltons.

25. The method of claim 20, wherein and said PEG polymer has a molecular weight ranging from about 1,000 to 100,000 Daltons.

* * * * *